(12) United States Patent
Jones et al.

(10) Patent No.: US 9,881,483 B2
(45) Date of Patent: Jan. 30, 2018

(54) VEHICLE BASED SYSTEM FOR MANAGING PERSONAL ITEMS

(71) Applicant: JAGUAR LAND ROVER LIMITED, Warwickshire (GB)

(72) Inventors: Matt Jones, Coventry (GB); Paul Wheller, Coventry (GB); Mike Allen, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 14/826,610

(22) Filed: Aug. 14, 2015

(65) Prior Publication Data

US 2017/0046942 A1 Feb. 16, 2017

(51) Int. Cl.
*G08B 21/24* (2006.01)
*G06Q 10/08* (2012.01)
*G06Q 50/30* (2012.01)

(52) U.S. Cl.
CPC ............ *G08B 21/24* (2013.01); *G06Q 10/08* (2013.01); *G06Q 10/087* (2013.01); *G06Q 10/0833* (2013.01); *G06Q 50/30* (2013.01)

(58) Field of Classification Search
None
See application file for complete search history.

(56) References Cited

U.S. PATENT DOCUMENTS

| 2007/0035397 | A1 | 2/2007 | Patenaude et al. |
| 2010/0188226 | A1* | 7/2010 | Seder ............. G08B 21/24 340/572.1 |
| 2010/0217457 | A1* | 8/2010 | Georgi .............. B60R 25/245 701/2 |

(Continued)

FOREIGN PATENT DOCUMENTS

| DE | 10 2007 009741 A1 | 10/2007 |
| DE | 10 2009 050756 A1 | 6/2010 |
| DE | 10 2011 018898 A1 | 10/2011 |

(Continued)

OTHER PUBLICATIONS

Combined Search and Examination Report under Sections 17 and 18(3) for Application No. GB 1602609.8 dated Aug. 11, 2016.

(Continued)

*Primary Examiner* — Leon-Viet Nguyen
(74) *Attorney, Agent, or Firm* — Carlson, Gaskey & Olds, P.C.

(57) ABSTRACT

An illustrative example embodiment of a system for assisting a driver with personal items includes a plurality of detectors that detect a signal from a transmitter that has been previously associated with a personal item; and a processor configured to: determine at least one characteristic of a journey, receive an indication from at least one of the detectors regarding a detected signal, identify a personal item and determine its location based on the detected signal, provide an indication if the determined location is different than an expected location based on the at least one characteristic of the vehicle journey, determine whether at least one other personal item is expected to be located based on the at least one characteristic of the vehicle journey, and provide an indication that the other personal item is expected but not detected.

22 Claims, 3 Drawing Sheets

(56) References Cited

U.S. PATENT DOCUMENTS

2010/0253473 A1    10/2010  Rork et al.
2015/0191150 A1*   7/2015   Van Wiemeersch .... B60R 25/33
                                                      340/5.61

FOREIGN PATENT DOCUMENTS

EP    2 871 622 A1    5/2015
WO    2006/030387 A1  3/2006
WO    2013/101057 A1  7/2013

OTHER PUBLICATIONS

International Search Report and Written Opinion of the International Searching Authority for International application No. PCT/EP2016/068982 dated Oct. 14, 2016.

* cited by examiner

VEHICLE BASED SYSTEM FOR MANAGING PERSONAL ITEMS

TECHNICAL FIELD

The present disclosure relates to managing personal items that may be placed within a vehicle. Aspects of the invention relate to a system, a vehicle and a method.

BACKGROUND

Modern life typically involves an increasing amount of material goods or personal items. Many people would agree that it is becoming increasingly difficult to keep track of or manage all of the items they need as they go about their daily routine. In many instances an individual drives a vehicle to a location to participate in an activity, such as work or recreation. Depending on the activity, an individual may need to bring different things and that requires remembering to place the needed or desired items in the vehicle before travelling to the location of that activity.

Embodiments of this invention make it easier to manage or keep track of personal items that a vehicle owner or driver desires to bring in the vehicle.

SUMMARY

Aspects and embodiments of the invention provide a system, a method and a vehicle as claimed in the appended claims.

According to an aspect of the invention there is provided a system for assisting a driver with personal items including: detecting means for detecting a wireless signal from a transmitter that has been previously associated with a personal item; and at least one assistance means that is configured to: determine at least one characteristic of a vehicle journey, the at least one characteristic being determined near a beginning of the journey; communicate with the detecting means to receive an indication from the detecting means, the indication providing information regarding at least one detected signal; identify at least one personal item associated with a transmitter that transmitted a detected signal, determine a location of the at least one identified personal item based on the detected signal; provide an indication regarding the determined location if the determined location is different than an expected location based on the at least one characteristic of the vehicle journey; determine whether at least one other personal item is expected to be located based on the at least one characteristic of the vehicle journey, and provide an indication that at least one other personal item is expected but not detected.

In an example embodiment having one or more features of the system of the previous paragraph, the detecting means comprises a plurality of detectors and the assistance means comprises at least one processor including at least one computing device and associated memory.

According to an aspect of the invention there is provided a system for assisting a driver with personal items including: a plurality of detectors configured to detect a wireless signal from a transmitter that has been previously associated with a personal item; and at least one processor including at least one computing device and an associated memory, the processor being configured to: determine at least one characteristic of a vehicle journey, the at least one characteristic being determined near a beginning of the journey, communicate with the plurality of detectors to receive an indication from at least one of the detectors at an input to the at least one computing device, the indication providing information regarding at least one detected signal, identify at least one personal item associated with a transmitter that transmitted a detected signal, determine a location of the at least one identified personal item based on the detected signal, provide an indication regarding the determined location if the determined location is different than an expected location based on the at least one characteristic of the vehicle journey, determine whether at least one other personal item is expected to be located based on the at least one characteristic of the vehicle journey, and provide an indication that at least one other personal item is expected but not detected.

In an example embodiment having one or more features of the system of the previous paragraph, the processor is configured to determine that a detected personal item remains in a determined location at the end of the vehicle journey; and provide an indication regarding the detected personal item that remains in the determined location.

In an example embodiment having one or more features of the system of any of the previous paragraphs, the at least one characteristic of the vehicle journey comprises at least one of a type of journey; an approximate time of a beginning of the journey; a number of individuals; a position of at least one individual; an identification of at least one individual; an intended destination; an indication from a vehicle owner's schedule; or an identification of the at least one identified personal item.

In an example embodiment having one or more features of the system of any of the previous paragraphs, the processor is configured to generate a list of personal items expected for each of a plurality of vehicle journey types.

In an example embodiment having one or more features of the system of any of the previous paragraphs, the processor generates the list based on at least one of user input regarding the personal items for at least one vehicle journey type; a stored listing of previously identified and located personal items for at least one vehicle journey type; or a predetermined look up table of expected items for at least one journey type.

In an example embodiment having one or more features of the system of any of the previous paragraphs, the processor has a learning mode during which the processor requests user input regarding the at least one characteristic of the vehicle journey and the processor uses the user input for subsequent determinations regarding personal items expected for a journey having the at least one characteristic indicated by the user input.

In an example embodiment having one or more features of the system of any of the previous paragraphs, the processor has a learning mode during which the processor learns what personal items are expected for a journey having the at least one characteristic based on user input regarding the expected personal items; or the processor learns what personal items are expected for a journey having the at least one characteristic based on identified personal items associated with a current journey having the characteristic and any previous journeys having the characteristic.

In an example embodiment having one or more features of the system of any of the previous paragraphs, the processor at least temporarily removes an item from the list of expected personal items during a vehicle journey based on user input.

In an example embodiment having one or more features of the system of any of the previous paragraphs, the processor is configured to communicate with another electronic device that provides information regarding an intended destination or an appointment on a vehicle owner's schedule for determining the at least one characteristic of the vehicle journey.

An example embodiment having one or more features of the system of any of the previous paragraphs includes a user interface that is controlled by the processor to communicate any provided indications to a driver or a passenger of a vehicle.

In an example embodiment having one or more features of the system of any of the previous paragraphs, the processor is configured to receive an inquiry from at least one other electronic device regarding a location of a selected personal item; determine whether a signal from a transmitter associated with the selected personal item is detected by any of the detectors; and report a determined location of the selected personal item to the other electronic device if the location can be determined by the processor.

According to another aspect of the invention a vehicle is provided that includes system having one or more features of the system of any of the previous paragraphs, the detectors are supported on the vehicle for detecting wireless signals from transmitters located near, in or on the vehicle; and the determined location of the at least one personal item is in relation to an interior of the vehicle.

According to another aspect of the invention there is provided a method of assisting a driver with personal items, including: determining at least one characteristic of a vehicle journey, the determining occurring near a beginning of the journey; detecting a wireless signal from a transmitter that has been previously associated with a personal item; identifying at least one personal item associated with the detected signal; determining a location of the at least one identified personal item based on the detected signal; providing an indication regarding the determined location if the determined location is different than an expected location based on the at least one characteristic of the vehicle journey; determining whether at least one other personal item is expected to be located based on the at least one characteristic of the vehicle journey; and providing an indication that at least one other personal item is expected but not detected.

In an example embodiment having one or more features of the method of the previous paragraph, the at least one characteristic of the vehicle journey comprises at least one of: a type of journey; an approximate time of a beginning of the journey; a number of individuals; a position of at least one individual; an identification of at least one individual; an intended destination; an indication from a vehicle owner's schedule; or an identification of the at least one identified personal item.

An example embodiment having one or more features of the method of any of the previous paragraphs includes generating a list of personal items expected for each of a plurality of vehicle journey types.

An example embodiment having one or more features of the system of any of the previous paragraphs includes generating the list based on at least one of: user input regarding the personal items for at least one vehicle journey type; a stored listing of previously identified and located personal items for at least one vehicle journey type; or a predetermined look up table of expected items for at least one journey type.

An example embodiment having one or more features of the system of any of the previous paragraphs includes using a learning mode including requesting user input regarding the at least one characteristic of the vehicle journey; and using the user input for subsequent determinations regarding personal items expected for a journey having the at least one characteristic indicated by the user input.

An example embodiment having one or more features of the system of any of the previous paragraphs includes using a learning mode including learning what personal items are expected for a journey having the at least one characteristic based on user input regarding the expected personal items; or learning what personal items are expected for a journey having the at least one characteristic based on identified personal items associated with a current journey having the characteristic and any previous journeys having the characteristic.

An example embodiment having one or more features of the system of any of the previous paragraphs includes at least temporarily removing an item from the list of expected personal items during a vehicle journey based on user input.

An example embodiment having one or more features of the system of any of the previous paragraphs includes receiving information from an electronic device regarding an intended destination or an appointment on a vehicle owner's schedule for determining the at least one characteristic of the vehicle journey.

An example embodiment having one or more features of the system of any of the previous paragraphs includes receiving an inquiry from at least one other electronic device regarding a location of a selected personal item; and reporting a determined location of the selected personal item to the other electronic device if the location can be determined.

An example embodiment having one or more features of the system of any of the previous paragraphs includes determining that a detected personal item remains in a determined location at the end of the vehicle journey; and providing an indication regarding the detected personal item that remains in the determined location.

According to another aspect of the invention there is provided a vehicle comprising a plurality of detectors and a processor configured to perform the method of any of the previous paragraphs.

Within the scope of this document it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Embodiments of this invention provide assistance to an individual for managing personal items that may be carried in a vehicle. A disclosed example embodiment provides information to an individual regarding items the individual may expect to be in a vehicle near a beginning of a journey. A disclosed example embodiment includes the ability to alert a driver when a personal item, which is expected to be taken on a journey, is not in the vehicle.

Figure 1:
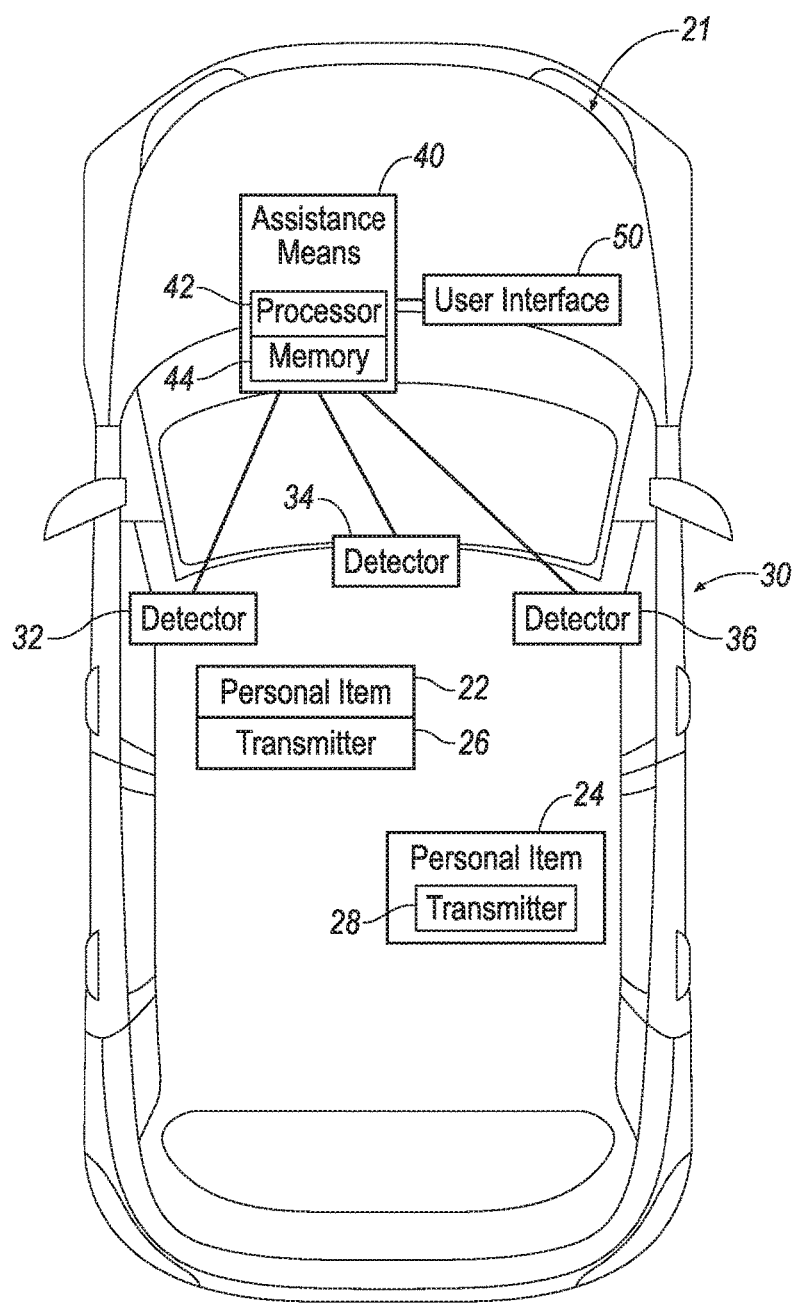
FIG. 1 diagrammatically illustrates an example system designed according to an embodiment of this invention.
Figure 2:
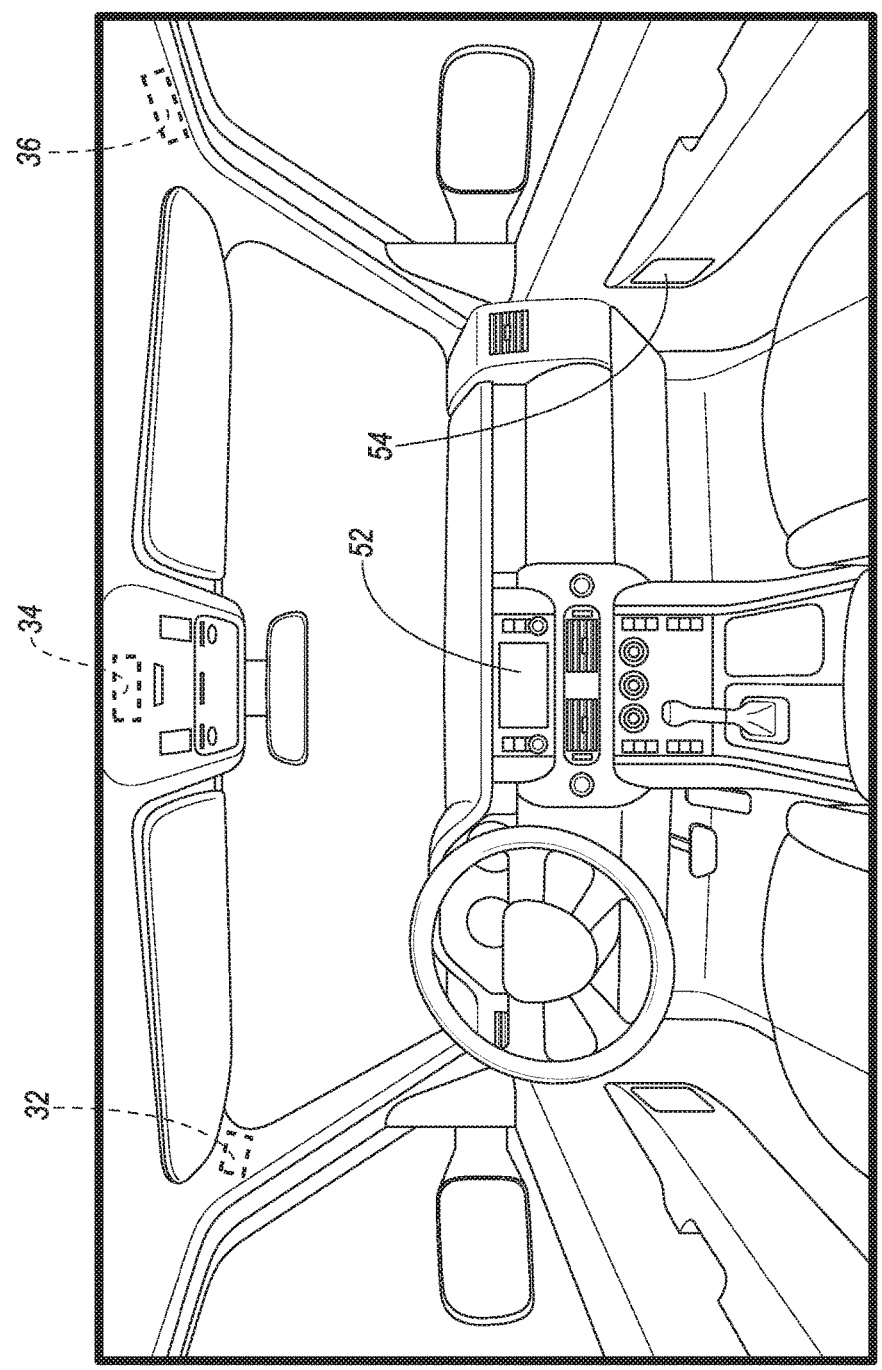
FIG. 2 schematically illustrates selected portions of a vehicle interior incorporating features of a system designed according to an embodiment of this invention.

FIGS. 1 and 2 schematically illustrate an example system 20 for assisting a vehicle owner or driver in managing personal items that may be carried in a vehicle 21. The phrase "personal item" is used in this description to refer to any object or item that may be placed in a vehicle for any purpose. Example personal items include a purse, a wallet, a driver's license, a mobile phone, a briefcase, a gym bag, a toy, or clothing. Some example scenarios involving such personal items will be mentioned below for discussion purposes. FIG. 1 schematically illustrates two personal items 22 and 24.

A signaling means 26 for transmitting at least one signal is associated with the personal item 22 and a signaling means 28 is associated with the personal item 24. In this example, the signaling means 26 and 28 comprise transmitters 26 and 28 that are each configured to transmit at least one wireless signal. The transmitters 26 and 28 of the disclosed example embodiment may comprise ultra-wide band transceivers, such as the single chip transceivers available from DecaWave. Such single chip transceivers are sometimes referred to as tags because they can be attached to or otherwise associated with an item of choice. Other example embodiments include transmitters that are compatible with known Bluetooth, Zigbee, or infrared signaling technologies.

In some instances, the transmitter 26 is secured to an exterior of the personal item 22. In other situations, the transmitter 26 may be supported on or secured to a case that is then utilized for the personal item 22. Commercially available DecaWave tags are useful in such embodiments. In the example of FIG. 1, the transmitter 28 is embodied as part of or inserted into the personal item 24. Those skilled in the art who have the benefit of this description will realize which configuration of a wireless signal transmitter will best meet their particular needs.

The system 20 includes detecting means 30 for detecting the presence of at least one personal item within a vehicle based on a signal from an associated signaling means. In the illustrated example, the detecting means 30 comprises a plurality of detectors 32, 34 and 36 that are configured to be situated in various locations on a vehicle. The detectors 32, 34 and 36 schematically shown in FIG. 2 are situated as part of the vehicle roof or headliner in positions where the detectors are able to detect wireless signals emanating from a device that is situated within the vehicle interior or near or on the vehicle. The detectors 32, 34 and 36 may comprise devices that are compatible with known wireless signaling technologies including ultra-wideband, Bluetooth, infrared or Zigbee communications.

The system 20 includes an assistance means 40 for providing assistance in managing personal items based on signals received or detected by the detectors 32-36. The assistance means 40 comprises at least one computing device that is configured or programmed to determine a location of a personal item that has an associated transmitter 26 or 28. The assistance means 40 in this example embodiment includes a processor 42 and associated memory 44. The example processor 42 may comprise a computational device having one or more electronic processors, such as a microprocessor, a microcontroller, an application specific integrated circuit (ASIC), or a combination of such processing devices. The assistance means 40 may comprise a single electronic processor or alternatively, different functions of the example processor 42 may be embodied in or hosted in different computing devices. The term "processor" as used in this description should be understood to include a single device or a plurality of devices collectively operating to provide the described functionality.

A set of instructions to be executed by the processor 42 may be stored on the memory 44. Such instructions, when executed, result in the assistance means 40 implementing the control techniques explained in this description including some or all of the functionality or methodology that is described. The set of instructions could be embedded in one or more electronic processors. Alternatively, the set of instructions could be provided as software to be executed by the processor 42. The assistance means 40 may be implemented in software run on one or more processors. Various arrangements of electronics for realizing or performing the functions of the assistance means 40 mentioned in this description may become apparent to those skilled in the art who have the benefit of this description.

In some example embodiments, the memory 44 contains stored instructions for software, firmware, programs, algorithms, scripts, applications, information, etc. that may govern all or part of the techniques associated with operation of the processor 42. The memory 44 in the illustrated example embodiment comprises a non-transitory computer readable storage medium, such as a magnetic storage medium, optical storage medium, magneto-optical storage medium, read only memory, random access memory, erasable programmable memory, flash memory, or electrical or other type of medium for storing computer-executable information and instructions. While the memory 44 is schematically shown as part of the assistance means 40, it may comprise a separate device that is electronically connected to other components of the system 20 using suitable communications, such as a CAN bus or SMBus to facilitate interaction between such devices.

The example system 20 includes information means 50 for providing information to an individual regarding the position of a personal item. In the illustrated example, the information means 50 comprises a user interface 50 that is configured to provide at least one of a visual or audible indication to an individual regarding a status of a personal item. As can be appreciated from FIG. 2, an example user interface includes a display screen 52 and at least one speaker 54.

Figure 3:
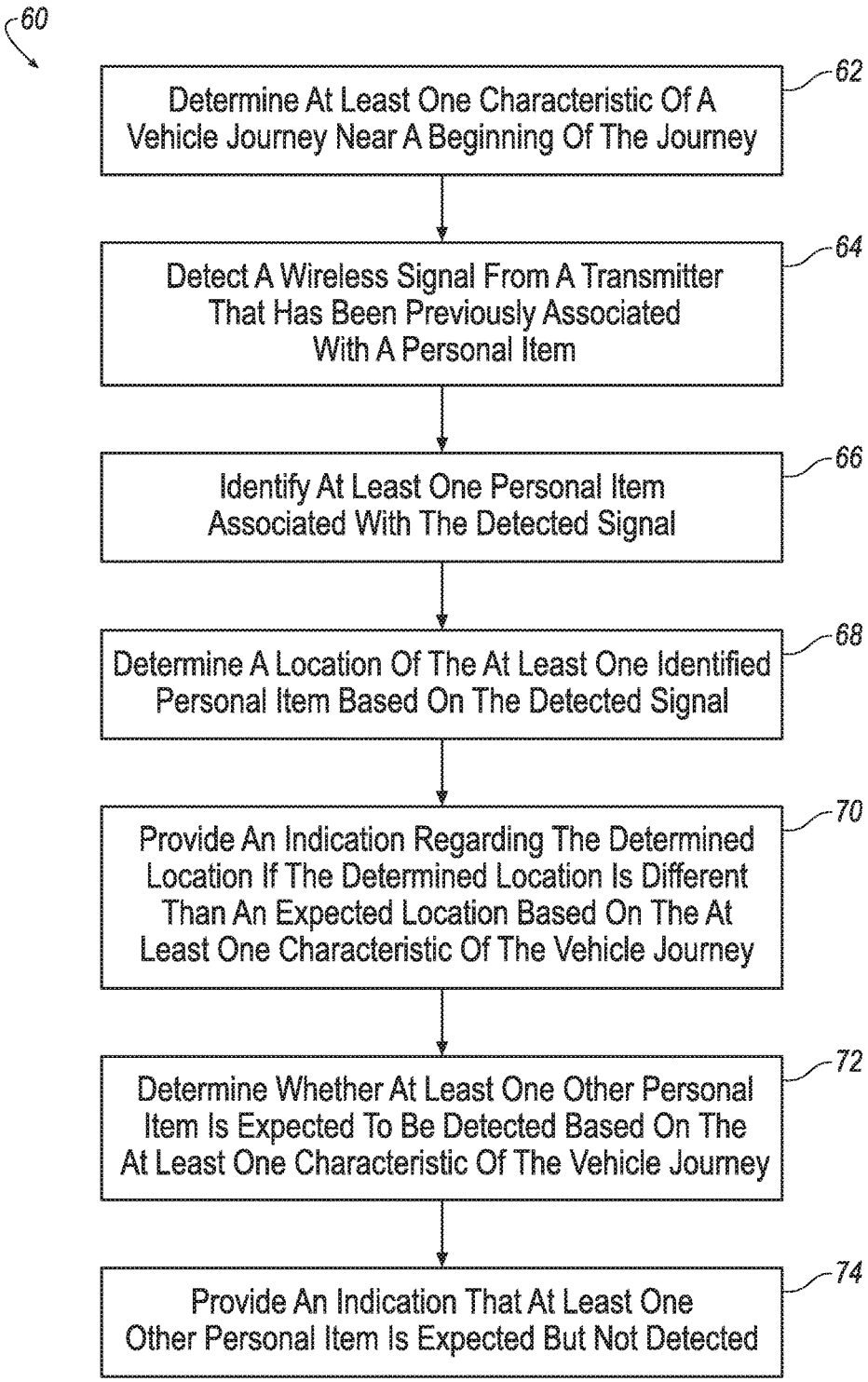
FIG. 3 is a flow chart diagram that summarizes an example driver assistance method.

FIG. 3 is a flowchart diagram 60 that summarizes an example method of assisting a driver or vehicle owner in managing personal items. In most examples, the process summarized in FIG. 3 will be completed before a vehicle is launched from a stationary position at the beginning of a journey but in some circumstances at least part of the process schematically shown in FIG. 3 may be completed during the first few moments of a journey while the vehicle is in motion.

At 62, the processor 42 determines at least one characteristic of a vehicle journey and makes this determination near a beginning of the journey. The processor 42 in this example makes a determination that a journey may begin soon based on user input or by recognizing activity near or involving the vehicle that is typically indicative that a driver desires to commence a journey using the vehicle. For example, the processor 42 may determine that a vehicle door has been opened, an individual has sat on the driver's seat and that a key is present in the vehicle. Under such circumstances, the processor makes the determination regarding at least one characteristic of the likely vehicle journey.

Example characteristics of a journey include: a type of journey, an approximate time of a beginning of the journey (which typically would be or correspond to the time during which the determination at 62 is being made), a number of individuals present in the vehicle, a position of at least one individual within the vehicle, an identification of at least one individual within the vehicle, an intended destination (which may be obtained from a vehicle navigation system that a driver has used to enter a desired destination), an indication from a vehicle owner's schedule (which may be obtained from another electronic device that a driver or vehicle owner uses to keep track of appointments), and an identification of the at least one personal item that is near or in the vehicle. The at least one characteristic is used as a basis for determining which, if any, personal items are expected to be in the vehicle for the journey.

The example processor 42 uses the determined characteristic to identify or estimate a type of vehicle journey. In some embodiments, the processor 42 requests user input to confirm the determined type of journey. For example, assume that the determined characteristic indicates that the driver is about to leave to travel to work. The processor 42 controls the user interface 50 to prompt the driver to confirm that the driver intends to travel to work. If appropriate confirmation is received, the processor 42 proceeds further through the steps schematically shown in FIG. 3. If the determined journey type is not acknowledged, the processor 42 may suggest an alternative type of journey and ask for confirmation from the driver or wait for some input from the driver to indicate the type of journey. Other embodiments do not involve or require such confirmation.

At 64, a wireless signal is detected from at least one transmitter 26, 28 using the plurality of detectors 32-36. At 66, the processor 42 identifies the personal item associated with the transmitter that provided the detected signal. In some embodiments, the vehicle owner provides information to the processor 42 that allows the processor to associate particular transmitter signals with particular devices so that the identity of each can be determined based on a corresponding received signal. At least the detectors 32-26 or the processor 42 provide the capability to distinguish between transmitters based on a received signal's content or characteristic.

At 68, the processor 42 determines the location of the personal item in relation to the interior of the vehicle based on the detected wireless signal from the transmitter associated with that item. In one example, when more than one of the detectors 32-36 detects a signal from one of the transmitters 26 or 28, known triangulation techniques are utilized to determine the location of the associated personal item. In some instances the determined location will be within the vehicle interior while in others the location may be near or on the vehicle but not in the interior. At 70, the vehicle owner or driver is provided with an indication regarding the determined location if it is different than an expected location. For example, if a purse or brief case is located on top of the vehicle, the driver is alerted to that fact before vehicle launch. In many instances the step shown at 70 will not be performed if all expected items are detected and located inside the vehicle.

In some situations an expected item may be intentionally placed in a roof top carrier or a trailer connected to the vehicle. If that is the case, the driver will not have any concern based on an indication that the item is outside the vehicle but, instead, will take that as confirmation that the item is where it belongs. The processor 42 may be instructed by user input or through adaptive learning that one or more items should be outside the vehicle for a particular journey type and will not provide any indication of possible misplacement under corresponding circumstances.

At 72, the processor 42 determines whether there are any other personal items that are expected to be detected and in the vehicle for the journey. For example, assume that the processor 42 has determined that the driver is about to travel to work and the processor has information, which may be stored in the memory 44, indicating that the driver typically brings a brief case, a wallet, a mobile phone, and a building entry pass when traveling to work and that the driver has previously associated a transmitter with each of those items. Under such circumstances, the processor 42 checks whether a signal is detected from the transmitter associated with each of those items. If any one of them is not detected or not located within the vehicle, the driver is provided an indication at 74 regarding any of those personal items that is expected but not detected. Such an indication allows the driver to retrieve any of those items prior to departing.

While not illustrated as a separate step in FIG. 3, some embodiments include providing an indication of all detected items at or near the time of engine start up or vehicle launch. This trip check list feature allows a driver to receive a visible or audible confirmation that everything the driver intends to bring is situated in the vehicle as expected.

A database for the processor 42 to use for determining whether all desired items are present within a vehicle may be developed in at least one of several ways and stored in the memory 44. One embodiment includes obtaining user input identifying the journey type, the items that are desired for each journey type, or both. Such embodiments may include at least one look up table that is configured based on the user input. The vehicle owner or driver may provide such input at various times to change the expected items for a particular journey type or to add new items or journey types to the database used by the processor 42.

Some embodiments include an intelligence gathering feature that allows the assistance means 40 to dynamically create or alter a listing of expected items for a journey type. The example assistance means 40 has a learning mode or phase during which the processor gathers information regarding which personal items are expected or desired for different journeys based on observations made by the processor 42. For example, if a driver typically leaves a particular location at approximately the same time and travels to a particular destination with certain personal items in the vehicle, the processor 42 may gather that information and create a journey profile. The location of the starting and ending points of the journey may be obtained from a vehicle navigation system, for example. A label for the journey or journey type may be assigned by the processor 42 and, in at least some embodiments, is confirmed by user input. The time of typical departure may be used as the characteristic for identifying the journey or journey type and the associated expected personal items.

In some examples, the learning phase is ongoing over time and the processor 42 automatically makes adjustments to a listing of items for a particular type of journey based on observed driver behavior. For example, if the driver typically brought several items in the vehicle when departing for work but then stopped bringing one of them for some time, the processor 42 can automatically delete that item from a list of expected items for a journey to work. In some such embodiments, the processor 42 prompts the driver or vehicle owner to confirm that an item may be removed from a list before the processor 42 makes such a change.

The processor 42 may, for example, determine that each time a child seat in the vehicle is occupied, a favorite toy or a bottle is typically brought in the vehicle. The processor 42 adds the toy or bottle to the list of expected items for any journey that includes an occupied child seat.

The processor 42 in some examples uses the detected presence of at least a first personal item as an indication that a second, different personal item also should be in the vehicle based on previous situations in which both items were in the vehicle. For example, if a diaper bag is detected within the vehicle but a baby bottle is not detected and both were previously detected on the same journey more than once, the processor 42 will provide an indication that the bottle is not present.

The example embodiment allows a driver to dismiss any indications regarding an item that the system 20 expects to be brought on the journey. The driver has an option to make such dismissal effective for an entire day or just the particular journey. Additionally, if a particular item will not ever be brought by the driver again, the driver can provide input that the processor 42 interprets as an instruction to remove that item from the memory 44 so that the driver is not subsequently bothered by any indications that the item is apparently missing.

The assistance means 40 in some embodiments performs a check for expected items near the beginning of a journey and then at each time that a vehicle door is opened or the vehicle engine is turned off during that journey. This feature assists a driver to prevent accidentally leaving an item, such as a wallet, in a business establishment or on top of the vehicle.

The assistance means 40 in some embodiments also provides information to a driver near the end of a journey. For example, if an item is left in the vehicle after the vehicle has parked, the engine is shut off and the doors are locked, the assistance means 40 provides an audible (or otherwise discernable) indication to alert the driver to the situation. This feature may be useful when a mobile phone or wallet, for example, slip out of a pocket or purse unnoticed or a laptop computer or luggage is accidently left in the vehicle trunk or cargo compartment. Depending on the personal item, in some circumstances the detectors 32-36 will recognize the item while in other circumstances the processor 42 may communicate with or otherwise monitor the presence of the item, itself.

In at least one example embodiment, the processor 42 learns over time which items are typically removed from the vehicle at the end of a particular type of journey and provides an indication to the driver or vehicle owner when any of those items are left in the vehicle at the end of such a journey. For example, when the vehicle arrives at a place of business at the end of a commute to work and the briefcase, which is one of the expected items for that journey and is typically removed from the vehicle upon arrival, remains inside after the driver has left the vehicle the processor 42 determines that a notification should be provided to alert the driver regarding the briefcase. Such a notification need not specify which item is in the vehicle but could, instead, be a brief sound that the vehicle owner knows relates to item detection within the vehicle.

One example embodiment includes providing the processor 42 with an ability to consider a specific location of the item left in the vehicle when determining whether to notify the vehicle owner. For example, when a mobile phone is located between a seat and the center console or beneath a seat that is interpreted as a factor indicating that the phone was not intentionally placed there and notification would be warranted under those circumstances. By contrast, the processor 42 may interpret a location of the phone in a storage compartment as an intentional placement in that location and may not provide any notification to the vehicle owner. Given this description those skilled in the art will be able to program or otherwise configure a processor to perform such analysis in a manner that meets their particular needs or desires.

One feature of the example system 20 is that the assistance means 40 may receive communications from other electronic devices to allow an individual to determine whether a personal item has been left in the vehicle. For example, assume that a wallet has an associated transmitter and that it slipped out of a driver's pocket and fell between the driver seat and the center console. An individual may use a mobile phone or other computing device to inquire whether the wallet is within the vehicle. The assistance means 40 has the capability to communicate with such other electronic devices through a peer-to-peer communication protocol or through an Internet connection in some embodiments. If the system 40 locates the wallet, a communication to the other device can notify the individual that the wallet is in the vehicle and provide the specific location of the wallet.

The preceding description is illustrative rather than limiting in nature. Variations and modifications to the disclosed examples may become apparent to those skilled in the art that do not necessarily depart from the essence of the contribution to the art provided by the disclosed embodiments. The scope of legal protection can only be determined by studying the following claims.

We claim:

1. A system for assisting a driver with personal items, comprising:
    a plurality of detectors configured to detect a wireless signal from a transmitter that has been previously associated with a personal item; and
    at least one processor including at least one computing device and an associated memory, the processor being configured to:
    determine at least one characteristic of a vehicle journey, the at least one characteristic being determined near a beginning of the journey, the at least one characteristic including at least one of (i) a number of individuals in the vehicle, (ii) a position of at least one individual in the vehicle, and (iii) an identification of at least one individual within the vehicle,
    communicate with the plurality of detectors to receive an indication from at least one of the detectors at an input to the at least one computing device, the indication providing information regarding at least one detected signal,
    identify at least one personal item associated with a transmitter that transmitted a detected signal,
    determine a location of the at least one identified personal item based on the detected signal,
    provide an indication regarding the determined location if the determined location is different than an expected location based on the at least one characteristic of the vehicle journey,
    determine whether at least one other personal item is expected to be detected based on the at least one characteristic of the vehicle journey,
    provide an indication that at least one other personal item is expected but not detected, determine that a detected personal item remains in a determined location at the end of the vehicle journey; and in dependence on a specific location of the detected personal item, automatically provide an indication regarding the detected personal item that remains in the determined location.

2. The system of claim 1, wherein the at least one characteristic of the vehicle journey further comprises at least one of
   a type of journey;
   an approximate time of a beginning of the journey;
   an intended destination;
   an indication from a vehicle owner's schedule; or
   an identification of the at least one identified personal item.

3. The system of claim 1, wherein
   the processor is configured to generate a list of personal items expected for each of a plurality of vehicle journey types; and
   the processor generates the list based on at least one of:
      user input regarding the personal items for at least one vehicle journey type;
      a stored listing of previously identified and located personal items for at least one vehicle journey type; or
      a predetermined look up table of expected items for at least one journey type.

4. The system of claim 1, wherein the processor has a learning mode during which the processor requests user input regarding the at least one characteristic of the vehicle journey and the processor uses the user input for subsequent determinations regarding personal items expected for a journey having the at least one characteristic indicated by the user input.

5. The system of claim 1, wherein the processor has a learning mode during which
   the processor learns what personal items are expected for a journey having the at least one characteristic based on user input regarding the expected personal items; or
   the processor learns what personal items are expected for a journey having the at least one characteristic based on identified personal items associated with a current journey having the characteristic and any previous journeys having the characteristic.

6. The system of claim 5, wherein the processor at least temporarily removes an item from the list of expected personal items during a vehicle journey based on user input.

7. The system of claim 1, wherein the processor is configured to communicate with an electronic device that provides information regarding an intended destination or an appointment on a vehicle owner's schedule for determining the at least one characteristic of the vehicle journey.

8. The system of claim 1, comprising a user interface that is controlled by the processor to communicate any provided indications to a driver or a passenger of a vehicle.

9. The system of claim 1, wherein the processor is configured to
   receive an inquiry from at least one electronic device regarding a location of a selected personal item;
   determine whether a signal from a transmitter associated with the selected personal item is detected by any of the detectors; and
   report a determined location of the selected personal item to the at least one electronic device if the location can be determined by the processor.

10. A vehicle comprising the system of claim 1, wherein
    the detectors are supported on the vehicle for detecting wireless signals from transmitters located near, in or on the vehicle; and
    the determined location of the at least one personal item is in relation to an interior of the vehicle.

11. A method of assisting a driver with personal items, the method comprising:
    determining at least one characteristic of a vehicle journey, the determining occurring near a beginning of the journey, the at least one characteristic including at least one of (i) a number of individuals in the vehicle, (ii) a position of at least one individual in the vehicle, and (iii) an identification of at least one individual within the vehicle;
    detecting a wireless signal from a transmitter that has been previously associated with a personal item;
    identifying at least one personal item associated with the detected signal;
    determining a location of the at least one identified personal item based on the detected signal;
    providing an indication regarding the determined location if the determined location is different than an expected location based on the at least one characteristic of the vehicle journey;
    determining whether at least one other personal item is expected to be detected based on the at least one characteristic of the vehicle journey;
    providing an indication that at least one other personal item is expected but not detected;
    determining that a detected personal item remains in a determined location at the end of the vehicle journey; and
    in dependence on a specific location of the detected personal item, automatically providing an indication regarding the detected personal item that remains in the determined location.

12. The method of claim 11, wherein the at least one characteristic of the vehicle journey further comprises at least one of
    a type of journey;
    an approximate time of a beginning of the journey;
    an intended destination;
    an indication from a vehicle owner's schedule; or
    an identification of the at least one identified personal item.

13. The method of claim 11, comprising
    generating a list of personal items expected for each of a plurality of vehicle journey types; and
    generating the list based on at least one of:
       user input regarding the personal items for at least one vehicle journey type;
       a stored listing of previously identified and located personal items for at least one vehicle journey type; or
       a predetermined look up table of expected items for at least one journey type.

14. The method of claim 11, comprising using a learning mode including
    requesting user input regarding the at least one characteristic of the vehicle journey; and
    using the user input for subsequent determinations regarding personal items expected for a journey having the at least one characteristic indicated by the user input.

15. The method of claim 11, comprising using a learning mode including learning what personal items are expected for a journey having the at least one characteristic based on user input regarding the expected personal items; or learning what personal items are expected for a journey having the at least one characteristic based on identified personal items associated with a current journey having the characteristic and any previous journeys having the characteristic.

16. The method of claim 15, comprising at least temporarily removing an item from the list of expected personal items during a vehicle journey based on user input.

17. The method of claim 11, comprising receiving information from an electronic device regarding an intended destination or an appointment on a vehicle owner's schedule for determining the at least one characteristic of the vehicle journey.

18. The method of claim 11, comprising
receiving an inquiry from at least one electronic device regarding a location of a selected personal item; and
reporting a determined location of the selected personal item to the at least one electronic device if the location can be determined.

19. A vehicle comprising a plurality of detectors and a processor configured to perform the method of claim 11.

20. A system for assisting a driver with personal items, comprising:
a plurality of detectors configured to detect a wireless signal from a transmitter that has been previously associated with a personal item; and
at least one processor including at least one computing device and an associated memory, the processor being configured to:
determine at least one characteristic of a vehicle journey, the at least one characteristic being determined near a beginning of the journey,
determine a type of journey based on the at least one characteristic,
confirm the determined type of journey based on user input,
communicate with the plurality of detectors to receive an indication from at least one of the detectors at an input to the at least one computing device, the indication providing information regarding at least one detected signal,
identify at least one personal item associated with a transmitter that transmitted a detected signal,
determine a location of the at least one identified personal item based on the detected signal,
provide an indication regarding the determined location if the determined location is different than an expected location based on the at least one characteristic of the vehicle journey or the determined type of journey,
determine whether at least one other personal item is expected to be detected based on the at least one characteristic of the vehicle journey or the determined type of journey,
provide an indication that at least one other personal item is expected but not detected,
determine that a detected personal item remains in a determined location at the end of the vehicle journey, and
in dependence on a specific location of the detected personal item, automatically provide an indication regarding the detected personal item that remains in the determined location.

21. The system of claim 20, wherein the at least one characteristic includes at least one of (i) a number of individuals in the vehicle, (ii) a position of at least one individual in the vehicle, and (iii) an identification of at least one individual within the vehicle.

22. The system of claim 1, wherein the processor is configured to
determine a type of journey based on the at least one characteristic and
confirm the determined type of journey based on user input.

* * * * *